(12) United States Patent  
Burkett

(10) Patent No.: US 6,508,477 B2
(45) Date of Patent: Jan. 21, 2003

(54) MOBILE COMPRESSED GAS MODULE

(76) Inventor: Jerald S. Burkett, 8115 Calland Rd., West Liberty, OH (US) 43357

( * ) Notice: Subject to any disclaimer, the term of this patent is extended or adjusted under 35 U.S.C. 154(b) by 0 days.

(21) Appl. No.: 10/022,933

(22) Filed: Dec. 18, 2001

(65) Prior Publication Data

US 2002/0074755 A1 Jun. 20, 2002

Related U.S. Application Data

(63) Continuation of application No. 09/481,269, filed on Jan. 11, 2000, now abandoned.

(51) Int. Cl.[7] .................................................. B62B 1/00
(52) U.S. Cl. ................ 280/47.26; 220/590; 248/346.11
(58) Field of Search .............................. 280/79.5, 79.6, 280/47.24–47.29, 47.315, 652, 655; 220/562, 581; 248/312.1, 313, 310, 316.6

(56) References Cited

U.S. PATENT DOCUMENTS

| 2,835,503 A | 5/1958 | Humphries et al. |
| 3,512,740 A | 5/1970 | Podwalny |
| 3,774,802 A | 11/1973 | O'Cheskey |
| 3,809,353 A | 5/1974 | Good et al. |
| 4,241,839 A | 12/1980 | Alberghini |
| 4,424,999 A | 1/1984 | Commins |
| 5,292,140 A | 3/1994 | Laing |
| 5,393,080 A | 2/1995 | Ross |
| 5,549,318 A | 8/1996 | Ho |
| D374,533 S | 10/1996 | Read |
| 5,641,140 A | 6/1997 | Sorenson |
| 5,664,753 A | 9/1997 | Takei |
| 5,758,796 A | 6/1998 | Nishimura et al. |
| 5,862,938 A | 1/1999 | Burkett |
| 6,089,519 A | 7/2000 | Laybourne |

Primary Examiner—Daniel G. DePumpo
Assistant Examiner—Paul Royal, Jr.
(74) Attorney, Agent, or Firm—Biebel & French, L.P.A.

(57) ABSTRACT

A one piece, lightweight, compressed gas module designed for easy loading, unloading and transport to and from automobiles, aircraft, etc. as well as easy transport across a variety of terrains including floors, asphalt, and other surfaces. The compressed gas module includes a pressure vessel and frame wherein the frame includes a vertical member and horizontal members extending perpendicular to the vertical member at opposing ends of the vertical member. The pressure vessel includes polar ends wherein each polar end includes a boss for rigidly engaging a respective horizontal member whereby the pressure vessel forms a load bearing component of the module in combination with the frame.

19 Claims, 9 Drawing Sheets

MOBILE COMPRESSED GAS MODULE

CROSS-REFERENCE TO RELATED APPLICATION

This application is a contiuation of U.S. application Ser. No. 09/481,269, filed Jan. 11, 2000, now abandoned, the entire disclosure which is incorporated herein by reference.

BACKGROUND OF THE INVENTION

This invention relates to a lightweight mobile compressed gas module. This mobile module is for lightweight use and transport of large volumes of compressed gas in a compact mobile unit.

It is common practice for pressure vessels in the form of industrial gas cylinders to be manufactured with flat bottoms enabling the cylinders to stand upright for filling and general use. These industrial gas cylinders typically contain various gases under pressure (Argon, Acetylene, Nitrogen, Oxygen, etc.). The vast majority of the cylinders are constructed from steel and aluminum. These steel and aluminum pressure vessels are heavy and result in a low performance factor where the performance factor is defined as (PV)/W, where P=operating pressure, V=internal volume (water capacity), and W=weight of vessel at 0 psig.

It is common practice for these vessels to be transported to a site for use of the gas contained therein via an industrial type cart. These carts are designed for and function only as a temporary means of moving the cylinder from one location to another, usually from the fill station to the end use location. Heavy steel and aluminum pressure vessels are loaded and unloaded from the industrial cart once the delivery has been accomplished. Typically, the cylinders are temporarily supported to these industrial carts by a chain strapped around the cylinder or the cylinder is placed in a metal ring. Both of these designs scratch and damage the exterior of the pressure vessel which often, at a minimum, requires exterior refurbishment. Further, prior art carts are also heavy, reflecting the structural need to support a pressure vessel with poor performance factors, and these carts are also large and cumbersome and, in particular, do not lend themselves to being transported in automobiles. Therefore, for compressed gas applications that require a high level of transport and usage, the cylinder size must be reduced to reduce the weight to a manageable level for an individual to lift and move.

One example of this high usage and transport application of compressed gas is in the home medical oxygen market. The most common cylinder used in this application is what is called an "E" cylinder which, due to the poor performance factor of steel and aluminum, provides only 24 cu. ft. of oxygen, or 2-4 hours of oxygen consumption. Due to this low capacity, in some cases as many as 12 cylinders are required at the consumer's location to be rotated as the cylinder gas is consumed. These aluminum and steel cylinders typically weigh 8-10 lbs. each of which, in combination with an industrial type cart that weighs 4.5 lbs., results in a total average weight of 13.5 lbs.

In addition to the low capacity of the cylinders, the industrial carts utilized for transporting the cylinders are large, cumbersome, and inconvenient which greatly limits mobility. For example, these "E" carts typically will not fit behind the seat of a car as a result of the cart having a fixed handle length for a total height of 39 inches. The cylinder is not fixed to the cart, such that the cylinder may fall out of the cart when placed on its side. This causes a problem when placed in the trunk of a car for travel wherein the cylinder may fall out of the cart resulting in the cylinder being free to roll around the trunk and possibly damage the valve on the top of the cylinder. These cylinders also have a high L/D ratio (L=length, D=diameter) which results in a cylinder or cylinder/cart that is very susceptible to tipping over. This is a common problem and has an inherent safety hazard of the valve being sheared off which will result in a dangerous rapid expansion of the compressed gas. These cylinder carts also require a large floor space due to this high L/D ratio, and is typically on the order of 113 in$^2$.

Clearly a low profile (low L/D), lightweight, high capacity, compact, highly mobile compressed gas source is needed to address the above limitations.

SUMMARY OF THE INVENTION

The present invention provides a mobile compressed gas module including a frame having top and bottom horizontal members and a vertical member extending between the top and bottom horizontal members. A pressure vessel having a cylindrical side wall and hemispherical top and bottom polar ends is positioned between the top and bottom horizontal members.

The top and bottom horizontal members each define a proximal end and a distal end wherein the vertical member extends between the proximal ends, and the pressure vessel extends between the distal ends thereof.

The pressure vessel includes a lower fitting attached to the bottom polar end, and an upper fitting attached to the top polar end wherein the lower fitting is adapted to engage a lower cooperating structure at the bottom horizontal member for preventing horizontal or lateral movement of the bottom polar end of the pressure vessel relative to the bottom horizontal member. Similarly, the upper polar end of the pressure vessel includes an upper fitting attached thereto for engaging an upper cooperating structure at the top horizontal member for preventing horizontal or lateral movement of the top polar end relative to the top horizontal member.

The vertical member defines a generally planar structure which, in combination with the attached cylinder prevents the gas module from rolling if placed on its side. Further, the pressure vessel and vertical member define parallel structures extending between and rigidly engaged with the top and bottom horizontal members whereby the pressure vessel and vertical member combine to provide structural integrity for the compressed gas module.

The compressed gas module further includes a handle located at an upper end of the vertical member of the frame, and wheels which are located supported at the proximal end of the bottom horizontal member for permitting wheeled transport of the gas module. In addition, the handle is formed as a telescoping structure in order to permit the handle to be positioned at a convenient height for guiding the gas module on its wheels, and for positioning the handle at a low height to form a compact unit for storage and transportation of the gas module.

Therefore, it is an object of the present invention to provide a one-piece lightweight mobile compressed gas module which is easily transported, loaded, unloaded and lifted.

It is a further object of the invention to provide such a gas module which supplies a large volume of compressed gas.

It is another object of the invention to provide a mobile compressed gas module formed as a one-piece design comprised of a frame and pressure vessel wherein both the frame and pressure vessel are utilized as load carrying components contributing to the strength and stiffness of the gas module.

Other objects and advantages of the invention will be apparent from the following description, the accompanying drawings and the appended claims.

DETAILED DESCRIPTION OF THE PREFERRED EMBODIMENT

Figure 1:
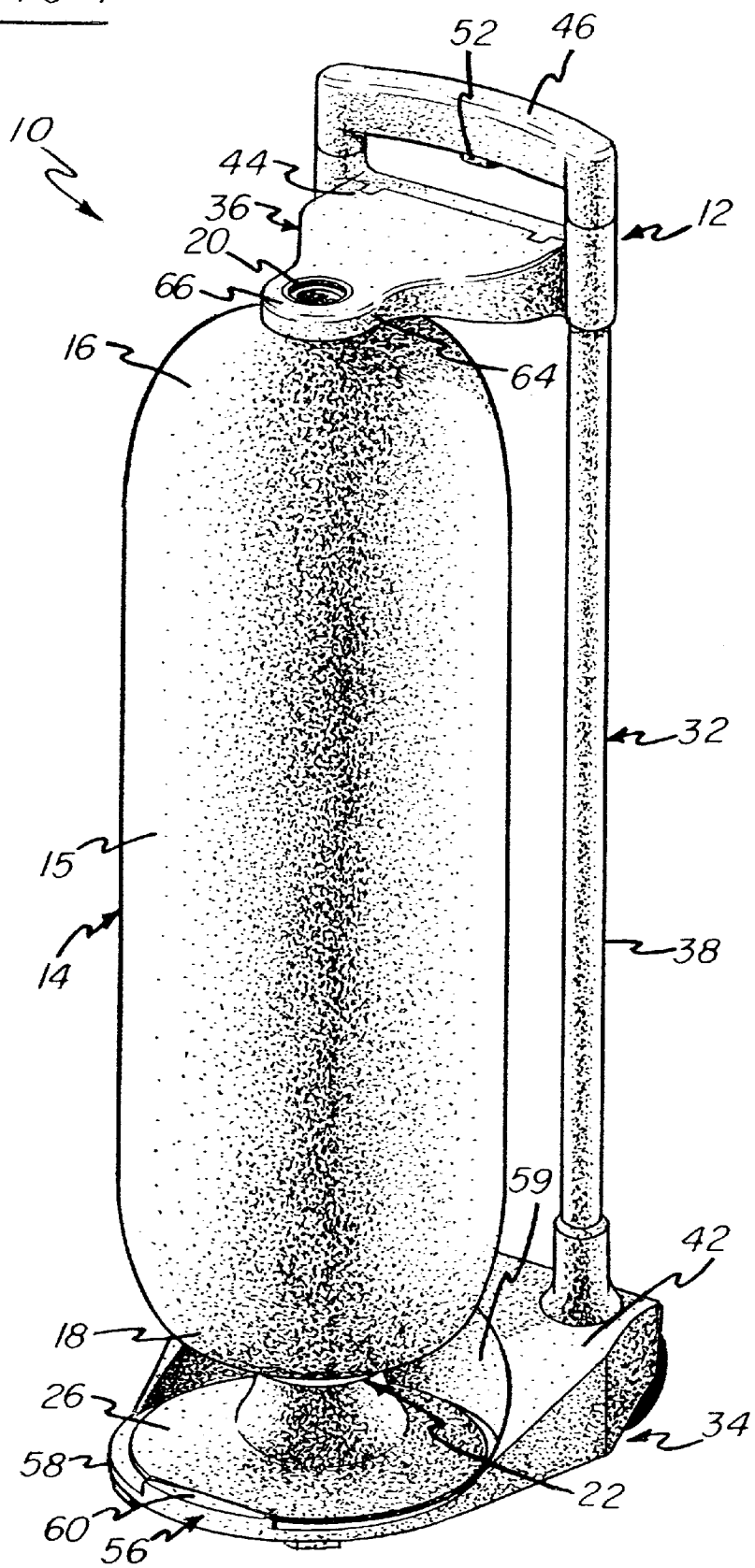
FIG. 1 is a perspective view of a first embodiment of the invention.

Referring initially to FIGS. 1–5, a first embodiment of the mobile compressed gas module 10 of the present invention is illustrated, and generally comprises a frame 12 and a pressure vessel 14 which are joined together to form a one-piece unit defining the gas module 10.

The pressure vessel 14 comprises a cylindrical side wall 15 and hemispherical top and bottom closed polar ends 16 and 18, respectively. As may be best seen in FIG. 2, an upper fitting 20 in the form of a cylindrical boss is integrally attached to the top polar end 16 and defines a passage into the pressure vessel 14 for filling and using gas contained within the pressure vessel 14, such as through attachment of a valve (not shown).

Figure 5:
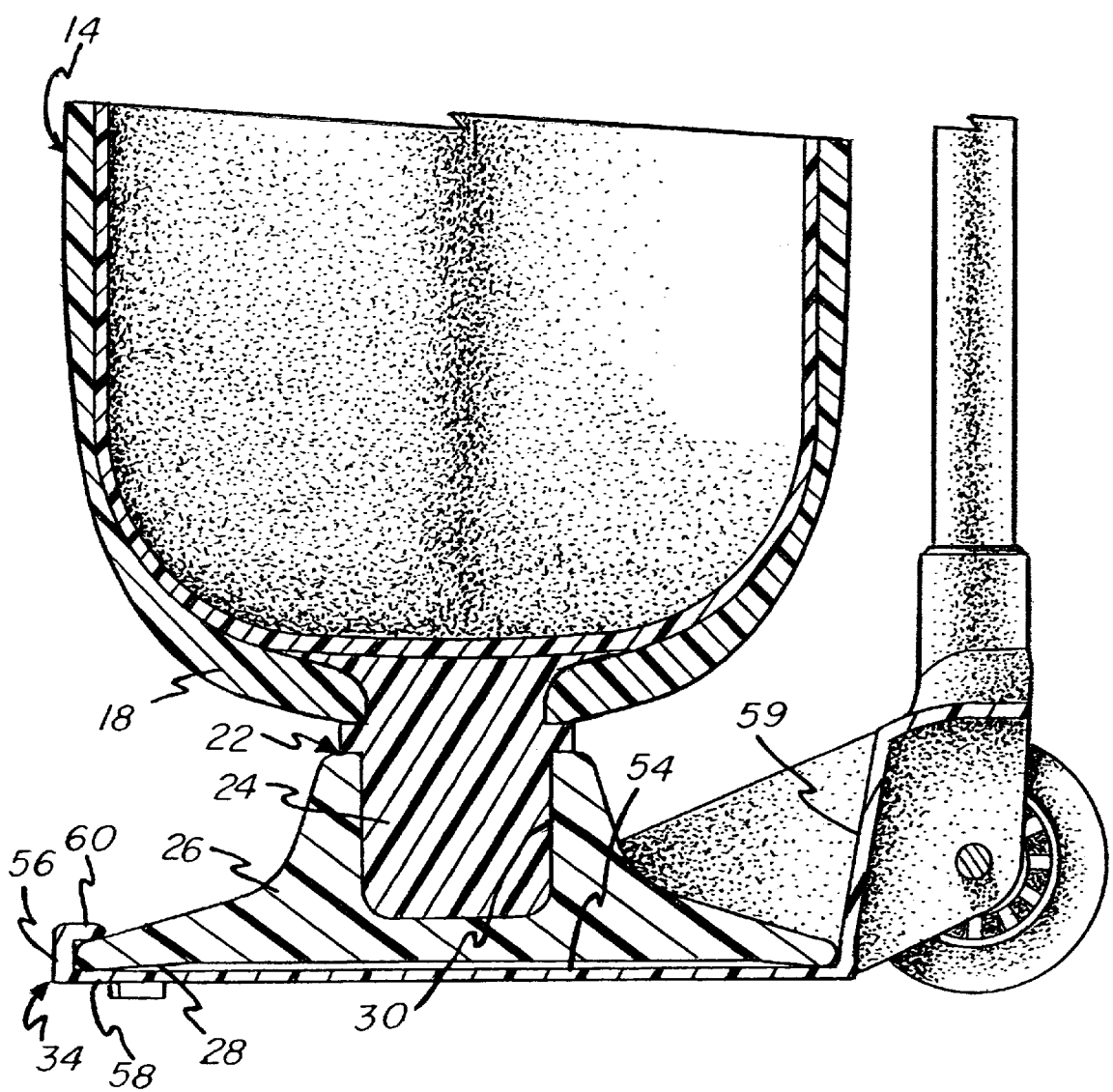
FIG. 5 is a cross sectional view of the lower portion of the embodiment of FIG. 1.
Figure 6:
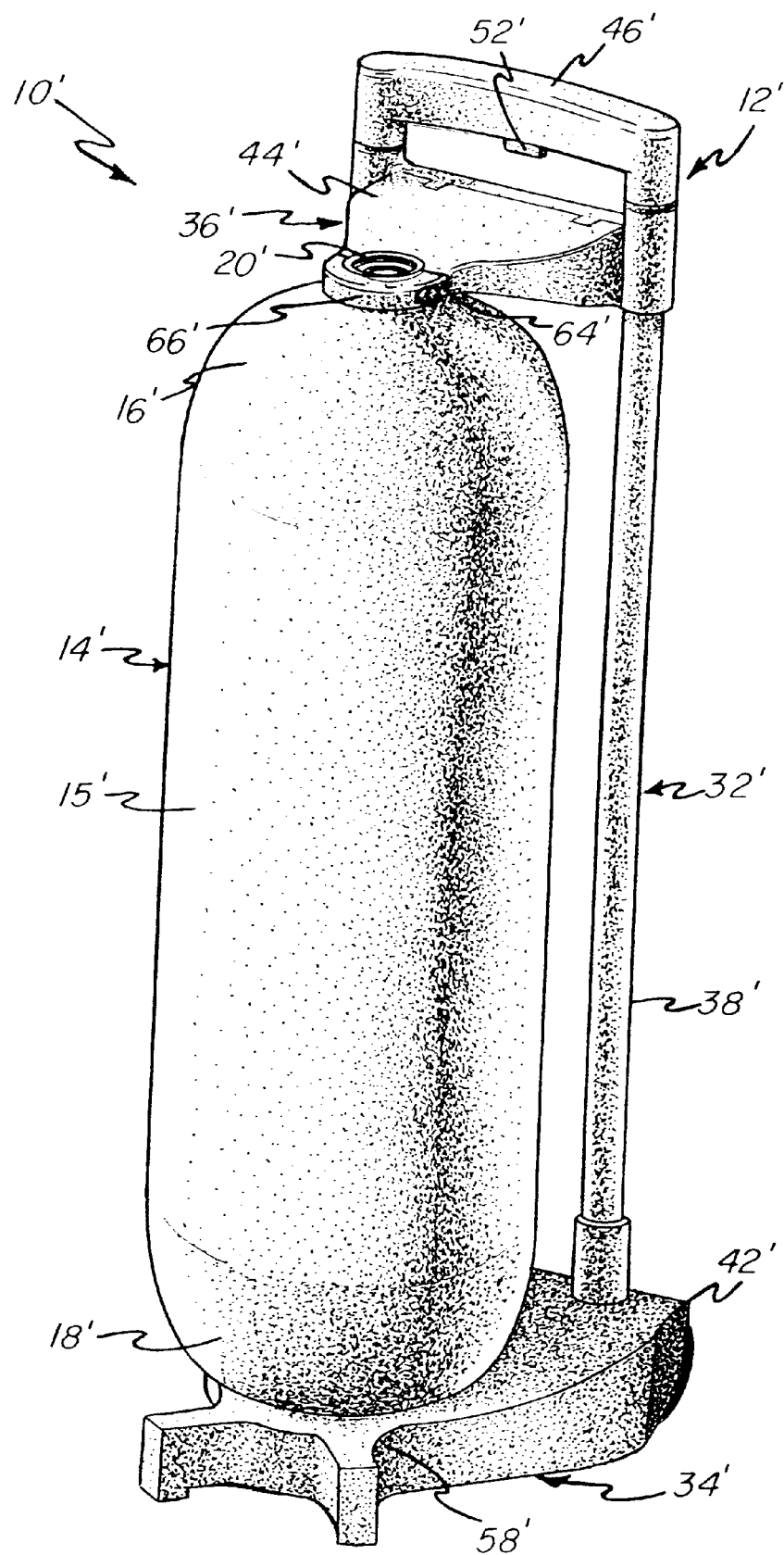
FIG. 6 is a perspective view of a second embodiment of the invention.

Referring to FIG. 5, a lower fitting 22 is located at the bottom end 18 of the pressure vessel 14 and comprises a cylindrical boss 24 integrally attached to the bottom polar end 18, and a base portion 26 defining a generally planar lower support surface 28 extending at least around the periphery of the base portion 26. The cylindrical boss 24 is rigidly affixed within an opening 30 in the base portion 26. The construction of the boss 24 attached integrally with the bottom end 18 of the pressure vessel 14 may be accomplished in accordance with the construction described in U.S. Pat. No. 5,862,938, commonly owned with the present application, which patent is incorporated herein by reference.

Figure 2:
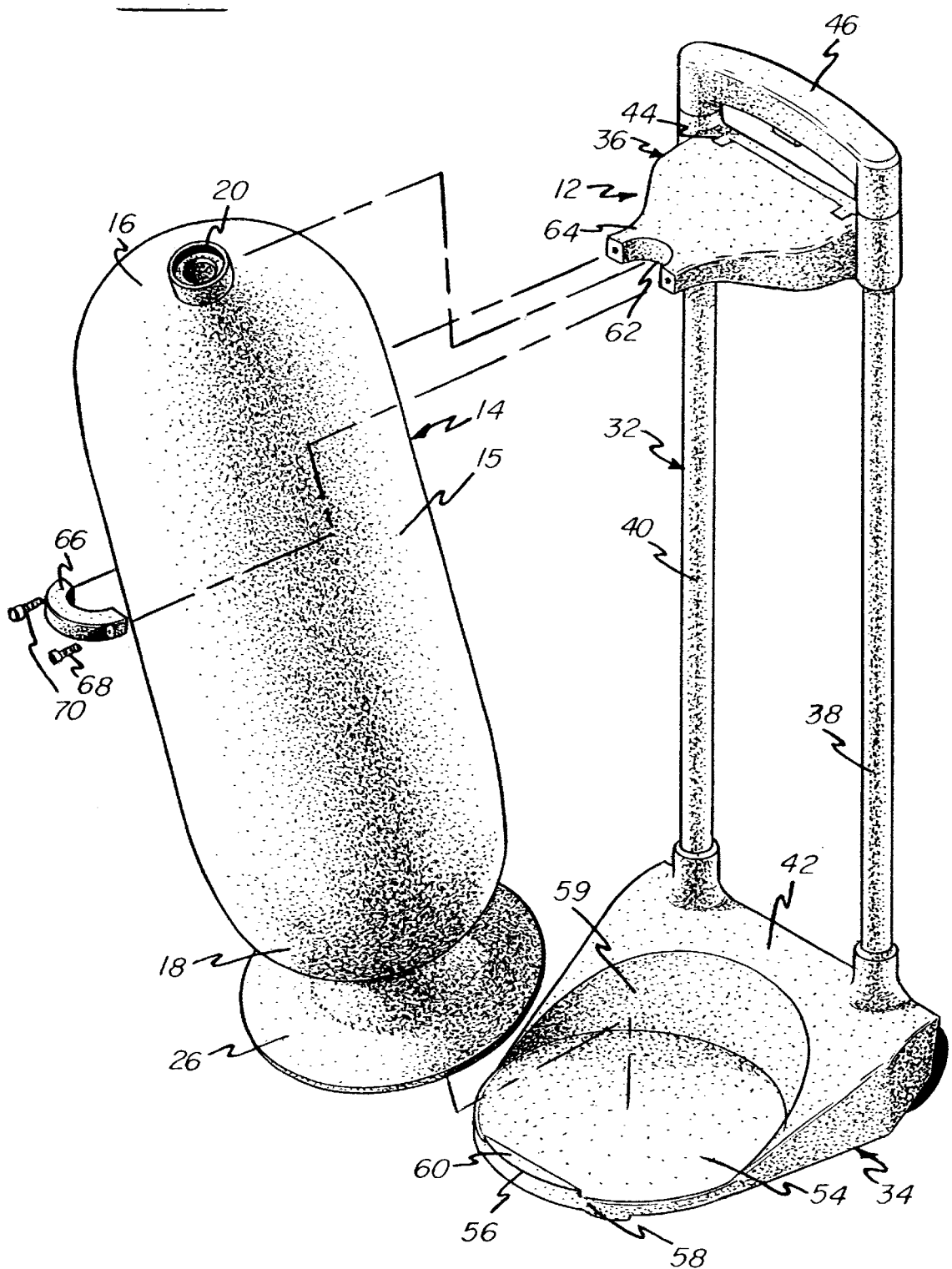
FIG. 2 is a perspective, partially exploded view of the embodiment of FIG. 1.
Figure 3:
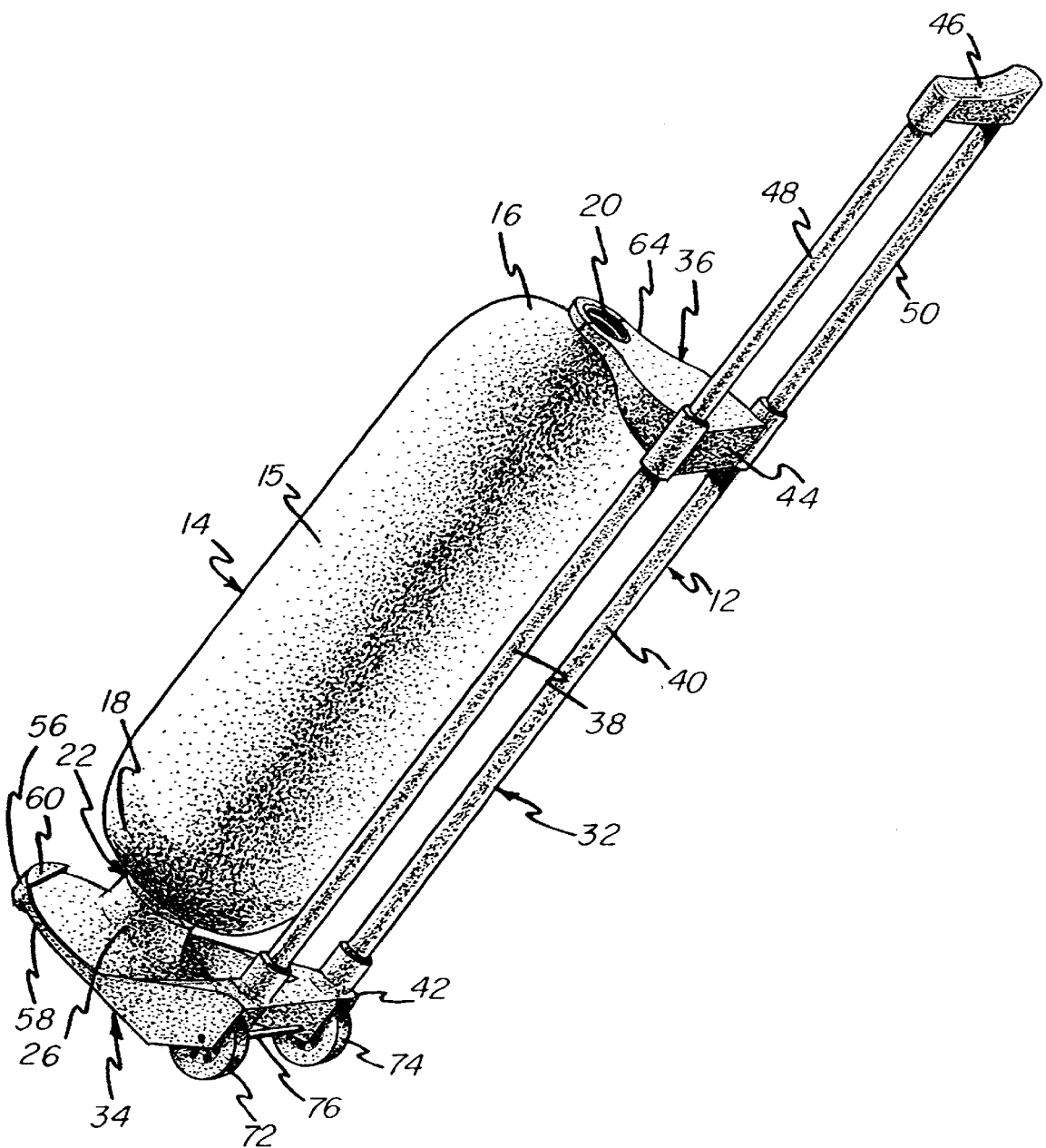
FIG. 3 is a rear perspective view of the embodiment of FIG. 1 with the handle extended.
Figure 4:
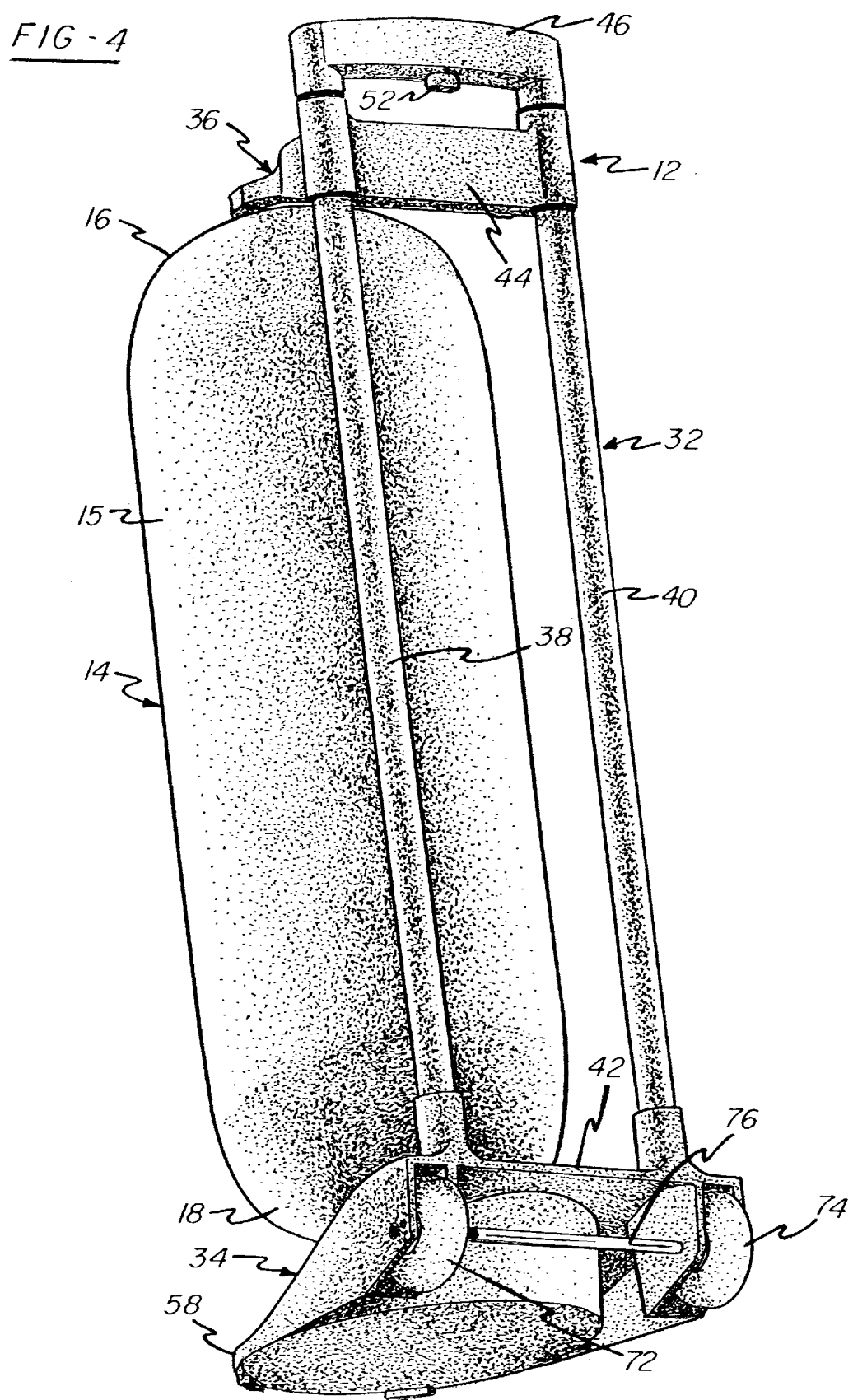
FIG. 4 is a bottom rear perspective view of the embodiment of FIG. 1.

Referring to FIG. 2, the frame 12 comprises a vertical member 32, a bottom horizontal member 34 and a top horizontal member 36. The vertical member 32 includes a pair of hollow, tubular members 38, 40 having lower ends attached to and extending upwardly from a proximal end 42 of the bottom member 34, and including upper ends attached to a proximal end 44 of the top member 36. Accordingly, the tubular members 38 define a generally planar configuration for the vertical member 32 which will be resistant to rolling should the gas module 10 be placed on its side.

A handle 46 is located adjacent to the upper end of the vertical member 32 and extends between the tubular members 38, 40. The handle 46 includes a pair of telescoping tubes 48, 50 which are telescopingly engaged within the tubular members 38, 40. The telescoping tubes 48, 50 permit the handle 46 to be positioned to an extended position, such as that shown in FIG. 3, for transporting the gas module 10, as well as for positioning the handle 46 in the position illustrated in FIG. 2 to provide a compact configuration for the gas module 10. Further, a push button 52 (see FIGS. 1 and 4) may be provided on the handle 46 for releasing a locking mechanism to permit the telescoping tubes 48, 50 to be moved to a selected extended position or positioned to the retracted position.

Referring again to FIG. 2, the bottom horizontal member 34 comprises a support surface 54 for supporting the planar lower support surface 28 of the base portion 26. In addition, the bottom member 34 includes a lower cooperating structure defined by a vertically extending wall 56 located adjacent a distal end 58 of the bottom member 34, and an additional peripheral wall structure 59 for cooperating with the peripheral edge of the base portion 26 to horizontally or laterally locate the base portion 26 against movement. Further, the wall 56 may be provided with a flange portion 60 for extending over a top surface of the base portion 26 to thereby positively position the edge of the base portion 26 against the vertical wall 56.

The top member 36 of the frame 12 includes a semicircular opening 62 at a distal end 64 thereof for engaging around a portion of the upper fitting 20. A semicircular ring 66 is provide for engaging around the remaining portion of the fitting 20 and is held in place by a pair of allen screws 68, 70 whereby the fitting 20 is detachably held in place at the distal end 64 of the top member 36. Accordingly, it should be apparent that both the top end 16 and bottom end 18 of the pressure vessel 14 are held against lateral or horizontal movement relative to the frame 12, and additionally that the pressure vessel 14 is vertically locked in position between the bottom and top members 34, 36. In this manner, the pressure vessel 14 is oriented parallel to the vertical frame member 32 and acts to form a structural member in combination with the frame 12 to define the gas module 10 as a one-piece unit.

It should further be noted that the attachment at the distal end 64 of the top member 36 provides an open area for receiving the fitting 20 whereby access to the top area of the fitting 20 is provided for permitting the pressure vessel 14 to be used to supply gas or to be refilled without detachment from the frame 12.

In order to facilitate transportation of the gas module 10, a pair of wheels 72, 74 (FIGS. 3 and 4) are supported at the proximal end 42 of the bottom member 34 by means of an axle 76. The back of the bottom member 34 is open such that the axle 76 may be accessed to be used as a second handle in conjunction with the handle 46 to lift or otherwise handle the gas module 10.

It should also be noted that while the pressure vessel 14 is intended to remain mounted to the frame 12, the base portion 26 provides a planar lower surface 28 which permits the pressure vessel 14 to be supported in a vertical orientation on a floor surface in the event that the pressure vessel 14 must be removed from the frame 12 for any reason.

Referring to FIGS. 6–9, an alternative embodiment of the invention is illustrated wherein elements of the second embodiment corresponding to elements of the first embodiment are identified with the same reference numerals primed.

The mobile compressed gas module 10' of the second embodiment comprises a pressure vessel 14' supported within a frame 12'. The pressure vessel 14' and frame 12' are substantially the same as for the pressure vessel 14 and frame 12 of the previous embodiment with the exception of the bottom horizontal member 34' and the lower cooperating structure between the bottom member 34' and the bottom polar end 18' of the pressure vessel 14'.

Figure 7:
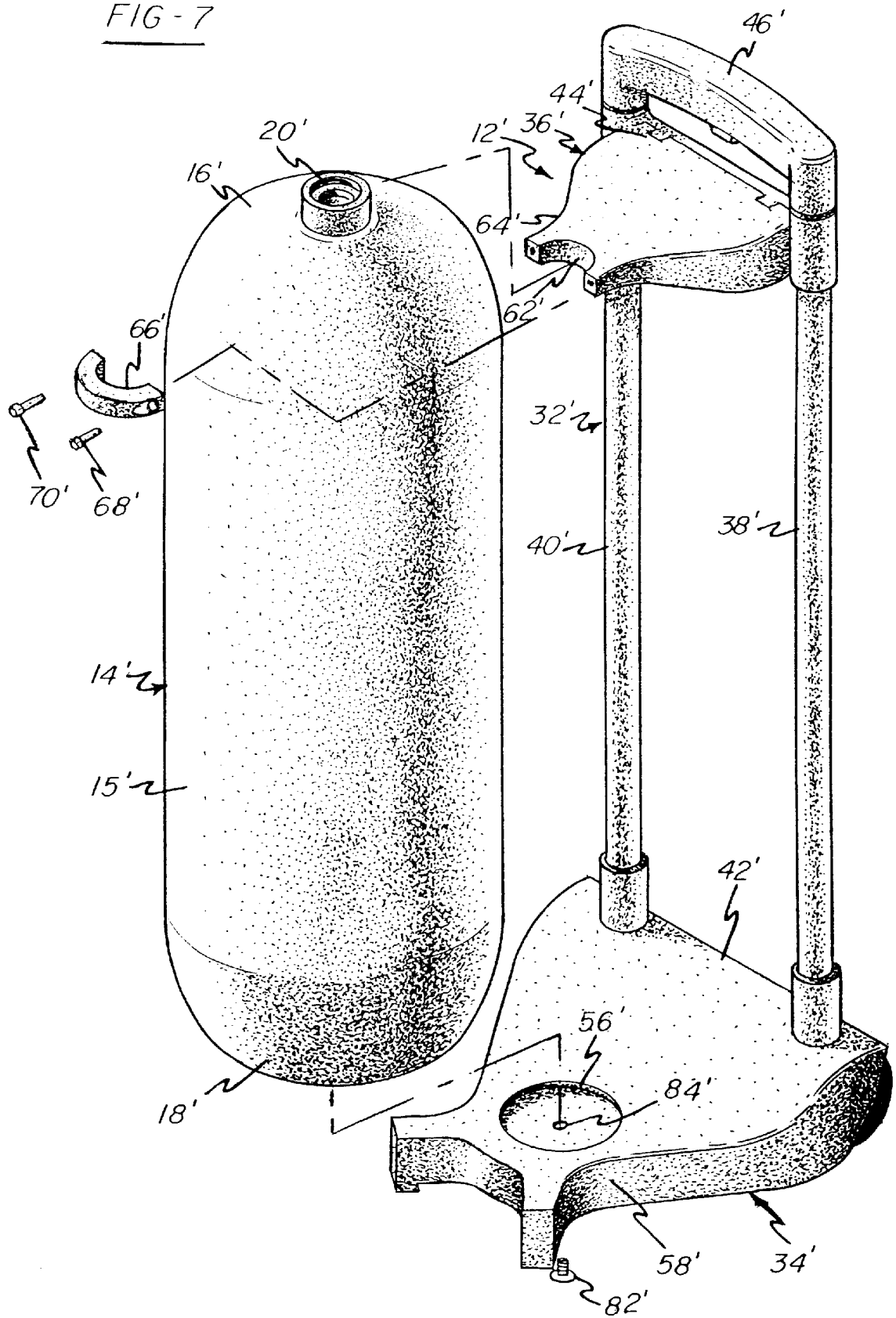
FIG. 7 is a perspective, partially exploded view of the embodiment of FIG. 6.
Figure 8:
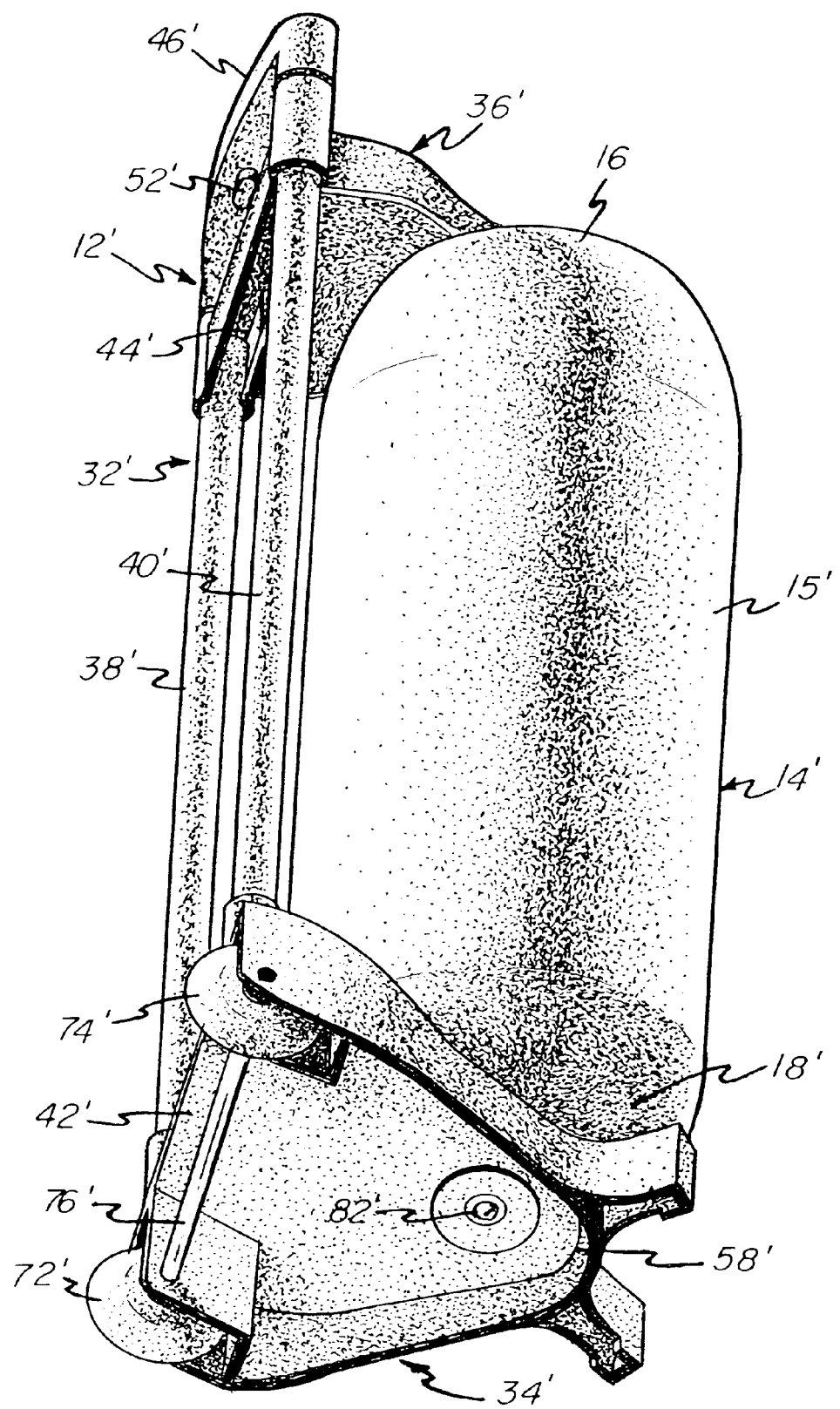
FIG. 8 is a bottom perspective view of the embodiment of FIG. 6.
Figure 9:
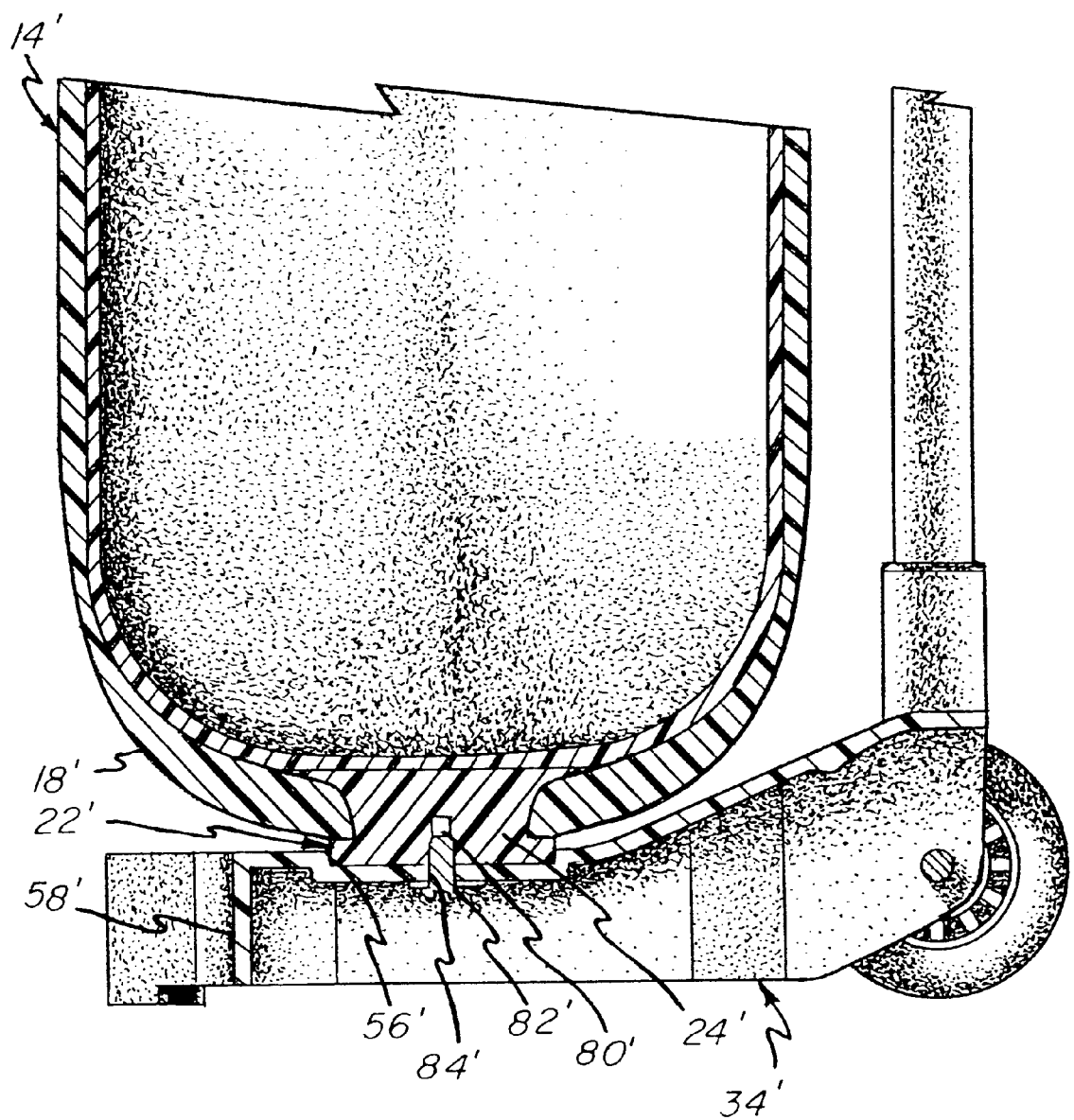
FIG. 9 is a cross sectional view of the lower portion of the embodiment of FIG. 6.

As may be seen in FIGS. 7–9, the bottom polar end 18' of the pressure vessel 14' is provided with a lower fitting 22' which comprises a boss 24' integrally attached to the pressure vessel 14' and constructed in accordance with the teachings of U.S. Pat. No. 5,862,938. The lower fitting 22' further includes a threaded opening 80' for receiving a threaded stud or fastener 82' in threaded engagement therein.

The bottom member 34' includes an aperture 84' located adjacent the distal end 58' for receiving the stud 82' therethrough whereby the bottom polar end 18' is rigidly held in engagement with the bottom member 34'. In addition, the bottom member 34' may be provided with a recess defined by a peripheral vertical wall 56' for engaging the outer peripheral edge of the boss 24'.

As with the previous embodiment, the pressure vessel 14' and frame 12' are connected to define a one-piece gas module having a compact configuration for supporting the pressure vessel 14' in such a way as to avoid contact between the frame 12' and the pressure vessel 14' to thereby protect the pressure vessel 14' against damage.

In view of the above description, it should be apparent that the present invention provides a lightweight compact mobile compressed gas module, capable of carrying a large volume of gas, and capable of being utilized in high usage and high transport environments, such as in the home medical respiratory oxygen market. For example, the present invention is capable of supplying 72 cu. ft. of compressed gas (oxygen). This is equivalent to three times the capacity of current "E" cylinders or up to 12 hours of compressed oxygen for the same weight. In particular, the total weight of this mobile compressed gas module is only 13.5 lbs., which is the same as the weight of a conventional "E" cylinder/cart combination. However, the present invention provides a more mobile and compact configuration than the prior art in that the total height of the present module is 25 inches, versus the 39 inch height of conventional cylinder/cart combinations, which permits the gas module of the present invention to be easily stowed upright behind the seat of an automobile or in the overhead bin of an aircraft.

The present module also requires less floor space than a typical "E" cart in that the present module requires approximately 88 cu. in., as compared to 113 cu. in. required for conventional cylinder/cart combinations. In addition, the present gas module provides a one-piece design that is easy to handle, lift, load, and move without danger of the pressure vessel falling out of or separating from the frame, and additionally will permit the present module to be turned upside down without the pressure vessel becoming separated from the frame.

The present gas module is also extremely stable in the upright position in that, as a result of its low L/D ratio, it is unlikely to be tipped over. Also, in the travel position, the overall module height is 39 inches to provide convenient transport of the module which is facilitated by the wheels, and which in the preferred embodiment are ball bearing wheels.

The frame of the present invention is preferably constructed of ultra lightweight materials to provide an extraordinary lightweight, and the low weight of the module is further facilitated by the space frame or truss type design provided by the vertical and horizontal members. Additionally, it should be understood that the overall weight of the module is reduced by incorporating the pressure vessel component of the module as a load bearing member whereby an extremely strong truss type design is provided by components which individually need not be designed to carry all of the stresses. Thus, the present design is structurally efficient in providing stress distribution, or load sharing, through a combination of lightweight, low cost components wherein the top and bottom members of the module are preferably formed of injection molded thermoplastic materials. The telescoping handle and tubular members are preferably constructed of lightweight aluminum, but could be constructed of carbon fiber/epoxy materials. The final lightweight component is formed by the pressure vessel which may be constructed of fiberglass, aramid, or carbon fiber in an epoxy matrix over a metallic or plastic liner known in the art of composite pressure vessel design. As mentioned previously, U.S. Pat. No. 5,862,938 discloses a pressure vessel construction which may be utilized in the present invention and which is directed to a composite pressure vessel incorporating an integrally formed lower support structure.

It should be understood that the two embodiments of the present gas module incorporate a "polar boss" to transfer module loads to the pressure vessel component safely. In particular, the polar boss described in U.S. Pat. No. 5,862,938 allows for a specially configured attachment point (polar boss) in the module without compromising the integrity of the pressure vessel component.

A further important feature of this invention pertains to the long term safety provided by the gas module while it is in service. The contact or fastening points at the top and bottom of the module between the pressure vessel and the frame avoid contact or fastening engagement to the cylindrical outside surface of the pressure vessel which is a load bearing material surface for containing the internal pressure exerted by the contained gas. For example, a strap, chain or metal ring, typical in a known industrial cart, will and does scratch and abrade the high pressure cylinder. This damage can lead to it being removed from service and discarded prematurely, such as during D.O.T. retest inspection. If a rubber strap or boot is used to hold any surface of the outer diameter of the cylinder, then the possibility of contaminating and damaging fluids, such as chemicals including mild acids, have been known to be trapped against the cylinder surface resulting in catastrophic failure. The present invention avoids surface contact on any load bearing surface and therefore removes the risk of abrasion or chemical attack associated with such contact.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A mobile compressed gas module comprising:

a frame having top and bottom horizontal members and a vertical member;

a pressure vessel having a cylindrical side wall and top and bottom polar ends;

said bottom horizontal member having proximal and distal ends;

said vertical member defining a generally planar structure having a lower end extending upwardly from said proximal end of said bottom horizontal member;

said top horizontal member having proximal and distal ends wherein said proximal end of said top horizontal member is attached to an upper end of said vertical member and extends generally perpendicularly from a plane defined by the generally planar structure;

a lower fitting attached to said bottom polar end of said pressure vessel;

a lower cooperating structure adjacent said distal end of said bottom horizontal member rigidly attached to said lower fitting for preventing horizontal and vertical movement of said bottom polar end relative to said bottom horizontal member;

an upper fitting attached to said top polar end of said pressure vessel;

an upper cooperating structure adjacent said distal end of said top horizontal member rigidly attached to said upper fitting for preventing horizontal and vertical movement of said top polar end relative to top horizontal member; and wherein said pressure vessel and said vertical member define parallel structures each of which extend between and rigidly engage with said top and bottom horizontal members such that said frame and said pressure vessel are rigidly connected to each other and cooperate to form a rigid module.

2. The module of claim 1 wherein said side of said pressure vessel is positioned out of contact with said frame.

3. The module of claim 1 wherein said upper fitting comprises an upper boss integrally attached to and extending from said top polar end, and said upper cooperating structure comprises a ring structure removably positioned around said upper boss.

4. The module of claim 1 wherein said lower fitting comprises a lower boss integrally attached to said bottom polar end defining an opening for receiving a stud member.

5. The module of claim 4 wherein said lower cooperating structure comprises an aperture in said bottom horizontal member, and a stud member extending through said aperture to engage in said opening in said lower boss.

6. The module of claim 5 wherein said opening in said lower boss and said stud member comprise cooperating threaded elements.

7. The module of claim 1 wherein said lower fitting comprises a lower boss integrally attached to said bottom polar end and a base portion defining a generally planar lower support surface, said lower boss being rigidly affixed to said base portion.

8. The module of claim 7 wherein said lower cooperating structure comprises a support surface on said bottom horizontal member supporting said base portion, and a vertically extending portion of said bottom horizontal member for defining a lateral location of said base portion on said bottom horizontal member.

9. The module of claim 8 wherein said vertically extending portion of said bottom horizontal member comprises a vertically extending wall defining a recess area for receiving said base portion.

10. The module of claim 7 wherein said lower boss comprises a member extending axially from said bottom polar end, and said base portion includes an opening for receiving said boss therein.

11. The module of claim 1 including wheels supported on said proximal end of bottom horizontal member.

12. The module of claim 1 including a handle located adjacent said upper end of said vertical member of said frame.

13. The module of claim 12 wherein said handle comprises a telescoping structure.

14. A mobile compressed gas module comprising:

a frame having top and bottom horizontal members and a vertical member;

a pressure vessel having a cylindrical side wall and top and bottom hemispherical polar ends;

said bottom horizontal member having proximal and distal ends;

said vertical member defining a generally planar structure having a lower and extending upwardly from said proximal end of said bottom horizontal member;

said top horizontal member having proximal and distal ends wherein said proximal end of said top horizontal member is attached to an upper end of said vertical member and extends generally perpendicularly from a plane defined by the generally planar structure;

a lower fitting attached to said bottom polar end of said pressure vessel;

a lower cooperating structure adjacent said distal end of said bottom horizontal member rigidly attached to said lower fitting for preventing horizontal and vertical movement of said bottom polar end relative to said bottom horizontal member;

an upper fitting attached to said top polar end of said pressure vessel, said upper fitting comprising an upper cylindrical boss integrally attached to and extending from said top polar end;

an upper cooperating structure adjacent said distal end of said top horizontal member comprising a ring structure removably positioned around said upper boss in rigid engagement with said upper boss for preventing horizontal and vertical movement of said top polar end relative to top horizontal member;

a handle located adjacent said upper end of said vertical member of said frame;

wheels supported on said proximal end of said bottom horizontal member for facilitating transport of said module; and wherein said pressure vessel and said vertical member define parallel structures each of which extend between and rigidly engage with said tip and bottom horizontal members such that said frame and said pressure vessel are rigidly connected to each other and cooperate to a rigid module and wherein said side of said pressure vessel is held in position out of contact with said frame.

15. The module of claim 14 whereinn said lower fitting comprises a lower boss integrally attached to said bottom polar end defining an opening for receiving a stud member.

16. The module of claim 15 wherein said lower cooperating structure comprises an aperture in said bottom horizontal member, and a stud member extends through said aperture to engage in said opening in said lower boss.

17. The module of claim 14 wherein said lower fitting comprises a lower boss integrally attached to said bottom polar end and a base portion defining a generally planar lower support surface, said lower boss being rigidly affixed to said base portion.

18. The module of claim 17 wherein said lower cooperating structure comprises a support surface on said bottom horizontal member supporting said base portion, and a vertically extending portion of said bottom horizontal member for defining a lateral location of said base portion on said bottom horizontal member.

19. The module of claim 18 wherein said vertically extending portion of said bottom horizontal member comprises a vertically extending wall defining a recess area for receiving said base portion.

* * * * *